Dec. 15, 1942.   W. J. DEGNEN   2,305,569
PROCESS AND APPARATUS FOR THE CATALYTIC CONVERSION OF HYDROCARBON OIL
Filed April 15, 1938   2 Sheets-Sheet 2
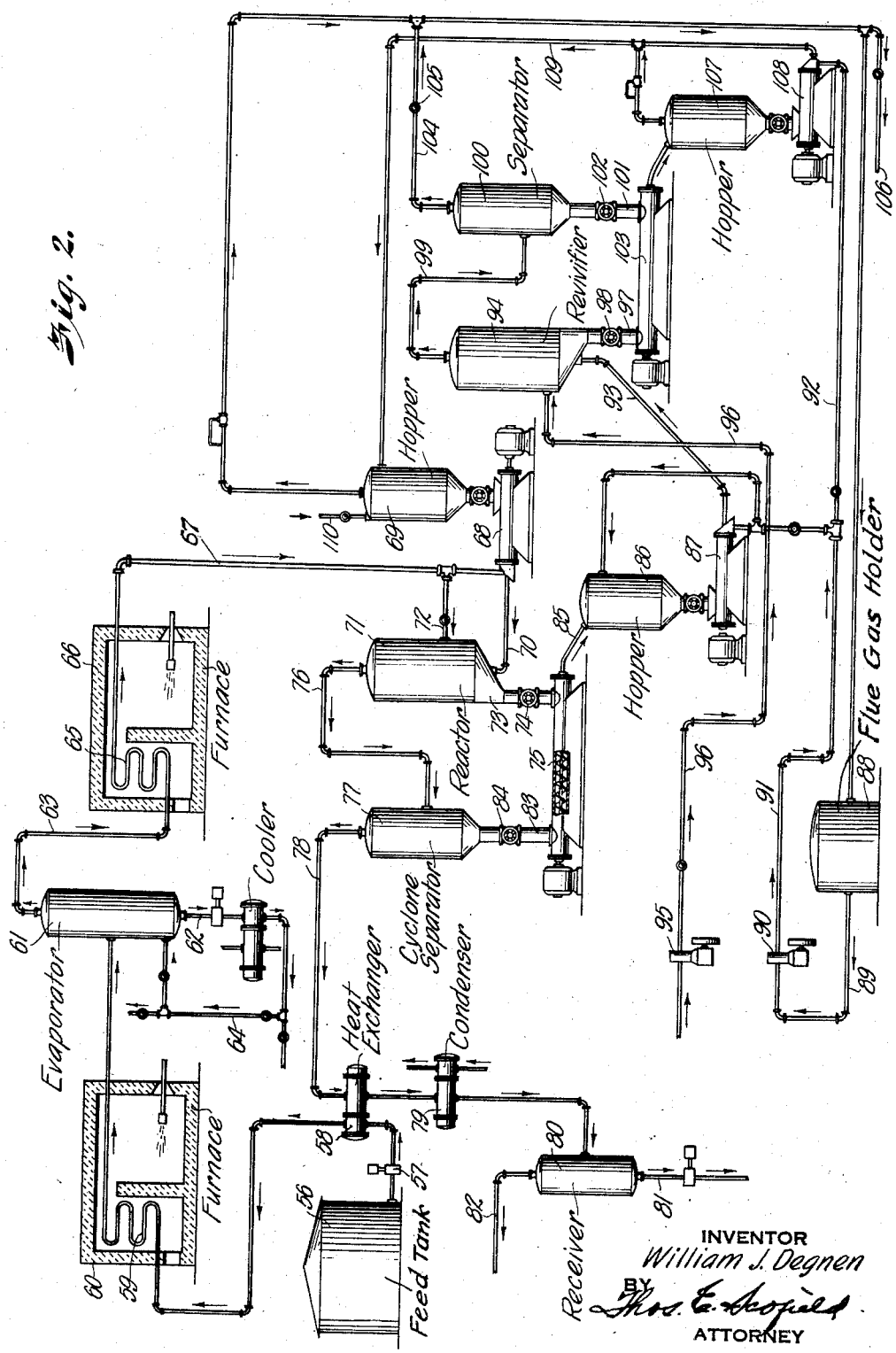

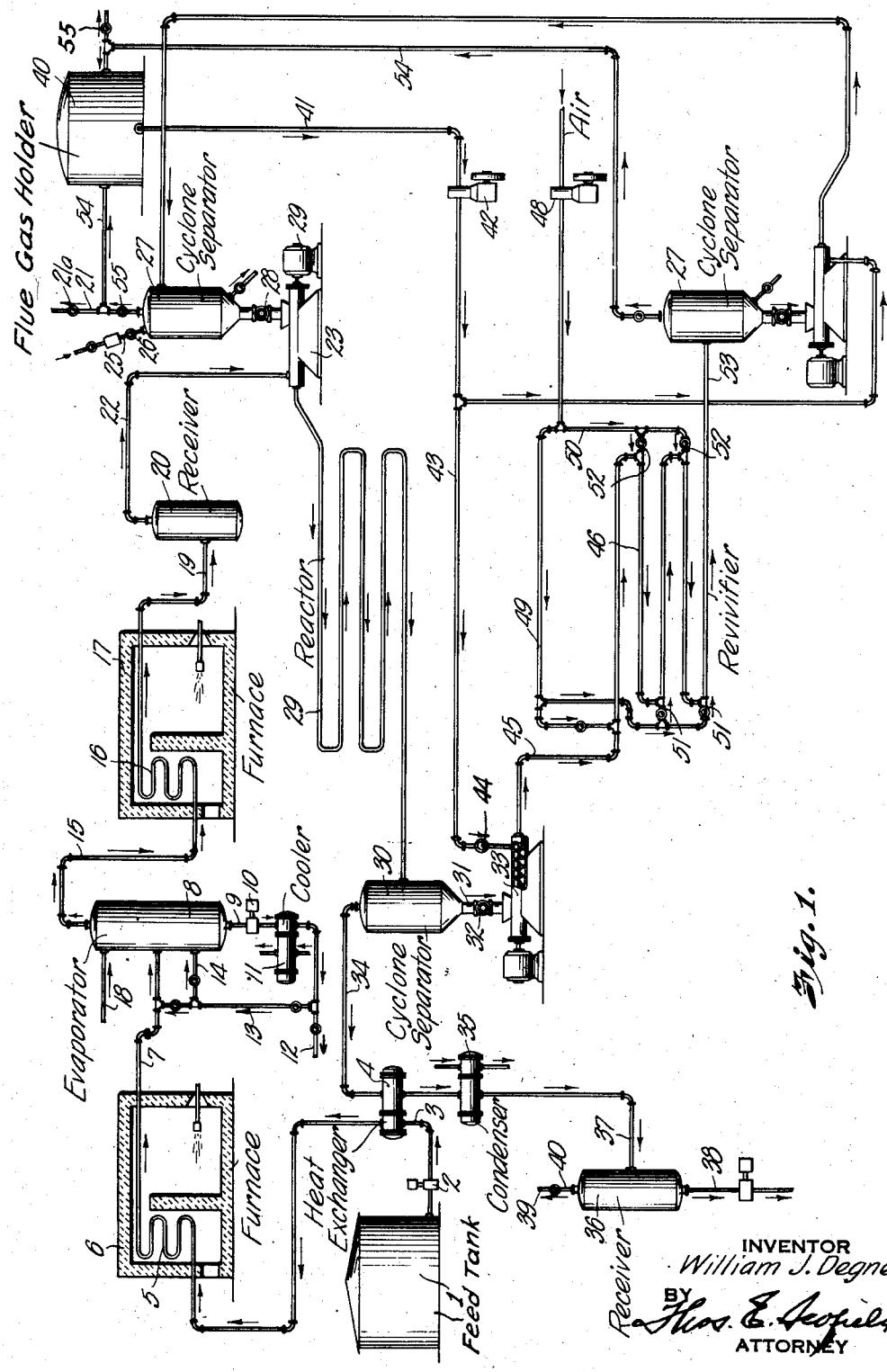

Patented Dec. 15, 1942

2,305,569

UNITED STATES PATENT OFFICE 2,305,569

PROCESS AND APPARATUS FOR THE CATALYTIC CONVERSION OF HYDROCARBON OIL

William J. Degnen, Cranford, N. J., assignor to The M. W. Kellogg Company, New York, N. Y., a corporation of Delaware Application April 15, 1938, Serial No. 202,252

16 Claims. (Cl. 196—52)

My invention relates to process and apparatus for converting hydrocarbons in the presence of a catalytic material. The art of cracking in the presence of a catalyst is well known where the catalyst is maintained in a bed and the liquid or vapor to be treated is passed through the bed during the conversion period. To regenerate or revivify a bed of catalyst in situ, it is necessary to apply heat to the catalytic material in such manner as to drive off carbonaceous or contaminating materials and difficulties have continually arisen in the regeneration of the catalyst due to the fact that heat can not be applied uniformly, nor has satisfactory means been devised to prevent channeling and packing of the catalyst.

An object and an advantage of the present invention is to provide a method of converting hydrocarbons in the presence of a catalyst so that during the reaction time, or during the period in which the hydrocarbons are in contact with the catalytic material, temperatures of reaction can be more or less accurately controlled. Another object of the invention is to provide an intimate mixture or association of the catalytic material and hydrocarbon vapors in such manner that the vapors are afforded an opportunity for more intimate mixture with the catalyst due to the fact that the catalyst is held in suspension in the vapor during the reaction period.

The method also provides a more complete utilization of the catalyst and permits a simplified method for regenerating or revivifying the catalyst.

The accompanying drawings, which form part of the specification and are to be read in conjunction therewith, comprise Fig. 1 and Fig. 2.

Fig. 1 is a diagrammatic showing of an apparatus in which the process may be operated. Fig. 2 is a modified type of apparatus using a different type of reactor, and revivifier.

Referring to the drawings, and describing a method for cracking topped crude in the apparatus, the charge is supplied from any suitable source, such as a tank 1, and is pumped by means of a pump 2 through a line 3 and heat exchanger 4 to the heating coil 5 in a furnace 6. In the furnace the charge is heated to a vaporizing temperature from 600 to 875 degrees F. and is discharged through a transfer line 7 to an evaporator 8, where the unvaporized oil is separated from the vapor. The tar, or unvaporized liquid is withdrawn from the evaporator through a pipe 9 and is pumped by pump 10 through a cooler 11 to storage through the pipe 12, or may be recirculated through line 13 either to the transfer line 7 or back into the evaporator by means of pipe 14. Valves in the lines 12, 13 and 14 furnish means for controlling this flow as described. The vapors rise in the evaporator and are directed through the vapor line 15 to heating coil 16 positioned in furnace 17, where the vapor temperature is raised to 925 degrees F. as a maximum. Into the top of the evaporator may be introduced a cooling liquid through the pipe 18 in order to regulate the top temperature maintained in the evaporating stage. From the vapor heater 16 the vapors pass through transfer line 19 through a receiver 20, serving as a surge tank or chamber. Vapors pass from the top of the receiver through pipe 22 and are introduced into a mixing device 23, where they are combined with the solid catalytic material. The catalyst is in a finely divided state, or in pulverulent form, the particle size being such that it may be readily picked up by the vapors in the form of a suspension. The catalytic material is supplied from any convenient source, through a pipe 25 controlled by a valve 26 into a hopper 27, whose discharge is connected to the pump 23, and is regulated by a valve or metering arrangement 28. The pump or mixer 23 is driven from any suitable source of power, such as a motor 29. This mixing device 23, which supplies the catalyst to the vapors is preferably an arrangement such as the device furnished by the Fuller Kinyon Co., and is described in detail either in United States Patent 1,553,539, and a modification thereof in United States Patent 2,102,330. A similar device, also furnished by the Fuller Kinyon Co., is known as the "Airveyor," the difference between the "Airveyor" and the mixers shown in the patents referred to being in the relative amount of carrier or air used to support the solid particles in suspension. In the "Airveyor" device, considerably more air is used to suspend the solid particles than is employed in the devices of Kinyon and Newcomer, described in the patent.

To the mixer 23 are supplied catalyst from the hopper 27 and vapors through the line 22. The vapors are at a reaction temperature and are mixed with the catalyst to form a suspension or mixture which has the characteristics of a fluid. This fluid is directed through a reactor 29, which is shown in the form of a continuous pipe or coil. In order to maintain the temperatures of the suspension of vapors and catalyst, the reactor is either heavily insulated or is positioned in a furnace setting to which the desired heat is supplied to maintain proper reaction temperatures. The discharge end of the reactor is connected to a separator 30 wherein the solid particles are separated from the suspension and are drawn off through a bottom discharge line 31 controlled by valve 32. This discharge pipe feeds into a conveyor arrangement which is shown as a screw conveyor 33, which directs the solid catalyst to the regenerating or revivifying stage.

The vapors separated from the catalyst in the separating vessel 30 pass out through the vapor line 34 and are passed in heat exchange with the charge in exchanger 4, and are thereafter condensed at 35 and directed to a receiver 36 through pipe 37. The receiver is equipped with a liquid draw-off line 38 and a gas line 39 controlled by a valve 40.

The screw conveyor 33, into which is charged catalyst from the separator 30, is a device of similar design and function as that shown at 23. Instead, however, of using hydrocarbon vapor to produce the suspension or fluid-like mixture of catalyst and vapor, flue gas is used to suspend the catalyst particles. This gas is obtained from any source, such as the gas holder 40 from which it is withdrawn through line 41, and pumped by compressor 42 through line 43 controlled by valve 44 to mixer 33, where it is intimately combined with the catalyst discharged from the separator. The gas-catalyst suspension passes through the pipe 45 into the revivifier 46, wherein the temperature is controlled within a range of from 800 to 1200 degrees F. as a maximum by introducing additional flue gas as required. To the revivifier, at a plurality of points along the travel of the gas-catalyst mixture therethrough, air is supplied by means of compressor 48 through connecting lines 49 and 50, which are equipped with secondary connections 51 and 52 regulated by suitable valves. The amount of oxidizing medium supplied to the gas-catalyst mixture is determined by the temperatures at which the catalyst is revivified and the extent of contamination. From the revivifier the mixture passes through pipe 53 and is discharged into the hopper 27, where the catalyst is permitted to separate from the gas, the gas rising into the top of the closed hopper and is withdrawn through pipe 54 by means of which it is returned to the flue gas holder 40. Valve 55 controls the flow of gas returned through pipe 54. Excess flue gas may be disposed of through pipe 21 controlled by valve 21a.

In the modified type of construction shown in Fig. 2, the charge is fed from the tank 56 by means of pump 57 through exchanger 58 to the heating coil 59 positioned in furnace 60. After being raised to a vaporizing temperature, the oil vapor mixture is separated in an evaporator 61 equipped with a liquid draw-off line 62 and vapor draw-off line 63. A recirculation line 64 is furnished to charge back portions of the tar into the transfer line between heater 59 and evaporator 61, or into the evaporator direct. The vapors are superheated in a heater 65 positioned in furnace 66, and are thence passed through line 67 into a vapor-catalyst mixing pump 68, similar in character to that shown at 23 and 33 in Fig. 1. Catalyst is supplied to the pump 68 from a hopper 69. The catalyst-vapor mixture is discharged from the pump 68 through line 70 into reactor 71, the discharge end of the transfer pipe 70 terminating in a nozzle or aspirating arrangement whereby the catalyst-vapor mixture is maintained in the reactor in the form of a cloud, mist or fog during the reaction period. A separate connection 72 between the line 67 and the reaction chamber 71 furnishes a means for by-passing the vapors around the mixing pump and directly to the reaction chamber. Valves in lines 67 and 72 may be regulated to control the amount of vapors by-passed. The nozzle arrangement at the discharge end of the pipe 70 may be of any suitable type, either a device which mechanically whirls the suspension of vapor and catalyst, or nozzles so arranged as to direct the suspension or cloud of vapor-catalyst mixture so that it is uniformly distributed throughout the catalyst chamber. The bottom of the reactor 71 is inclined to direct catalyst separated from the suspension into a discharge pipe 73 controlled by valve 74 into conveyor 75. From the reactor 71 the vapor-catalyst suspension passes through pipe 76 to separator 77 where the solid particles of catalyst are separated from the vapors. The vapors from the separator are directed through the vapor line 78 through exchanger 58 and condenser 79 to the gas separator or receiver 80, which is equipped with a liquid draw-off line 81 and a gas line 82. Catalyst removed from the vapors in the separator 77 passes out through pipe 83 controlled by valve 84 to the conveyor 75 where it joins the catalyst separated from the reactor, the combination passing through line 85 to hopper 86 which feeds mixing device 87, similar in nature to that shown at 68. The mixing device 87 is supplied with flue gas from the holder 88 through pipe 89 and flue gas compressor 90. This flue gas compressor discharges the flue gas through pipe 91 connected to mixer 87 and through pipe 92 to a separate mixing device hereinafter described. The flue gas-catalyst mixture or suspension formed in mixing device 87 is passed through pipe 93 into a revivifier 94, of similar construction to the reactor 71, the mixture of flue gas and catalyst being discharged in the form of a cloud or mist in the revivifying chamber, there being supplied an oxidizing gas such as air by means of compressor 95 through pipe 96. Valves in the flue gas and air supply lines furnish means for controlling the supply of the respective mediums. Catalyst which separates from the flue gas in the revivifying chamber is withdrawn through line 97 controlled by valve 98. The revivification product gases pass from the revivifier 94 through line 99 to a separator 100, where any remaining catalyst particles are removed from the gaseous material. This catalyst is withdrawn through line 101 controlled by valve 102 and is combined with the catalyst removed from the revivifying chamber in a conveyor 103. The gaseous material is discharged from the separator 100 through line 104 controlled by valve 105, and is returned to the flue gas holder 88. A line 106 controlled by a suitable valve furnishes a means for withdrawing excess flue gas from the system. The revivified catalyst picked up by the conveyor 103 is discharged into a hopper 107 from which it is supplied to a mixing device 108, similar to that shown at 68. Flue gas is introduced into this mixing device through line 92 to serve as a carrier medium to return the revivified catalyst through pipe 19 back to the hopper 69 of the mixing device 68. Hopper 107 and mixing device 108 may be dispensed with by discharging catalyst from conveyor 103 directly into hopper 69. Fresh catalyst may be supplied to the hopper 69 through pipe 110 controlled by suitable valve.

While the process has been described in connection with the treatment of relatively heavy oil including a viscosity breaking operation, it is contemplated as well that any suitable type of charging stock may be used, such as gas oil, and lighter fractions of hydrocarbons, such as kerosene. The temperature ranges employed during the reaction period, and the length of the period of reaction may be regulated according to the character of the charging stock and the nature of the products which it is desired to obtain.

In its essence, the process has to do with a method of mixing hydrocarbon vapor and a solid catalyst in the form of a suspension in order to obtain an intimate combination of the vapors and catalyst. In this way a more complete and uniform reaction is obtained and the temperatures of reaction more accurately controlled. The process is provided with a revivification stage through which the catalyst is circulated in each cycle, wherein it is subjected to temperature and other conditions to produce revivification and regeneration of the catalyst. The revivifying of the solid particles is effected in a similar manner to the reaction of the hydrocarbon vapors, that is, they are incorporated in a fluid-like stream of gaseous material and carried along in the form of a suspension during the revivification thereof.

Suitable apparatus has been shown to produce the suspension of hydrocarbon vapor and catalyst in the reaction stage and the suspension of used catalyst and flue gas and a regenerating medium in the revivifying stage, although it is understood that changes may be made in the apparatus without departing from the spirit of the invention.

Although any type of catalyst may be used which will satisfactorily accomplish the results desired, preferably a catalytic material made by depositing alumina on silica gel has been found to give very satisfactory results. Alternative types of catalysts may be suggested, such as diatomaceous earth, bauxite, or other types of siliceous matter. Also nickel or other metals which have catalytic characteristics deposited on carriers including clay, gels, or pumice may be used with good results.

The velocity of the suspension, in the modification shown in Fig. 1, must be at a rate sufficient to maintain the solid particles in suspension, and a range of velocities from 50 feet per second to 400 feet per second are satisfactory. Usually velocities ranging from 130 feet to 250 feet per second are used. The necessity for higher velocities will depend somewhat upon the particle size of the catalyst, which may range anywhere from 20 to 200 mesh material, the finer particles being obviously maintained more easily in suspension than the larger particles.

It is not the purpose of limiting the temperature and pressure conditions used, but to include those temperatures and pressures necessary for proper conversion of the particular stock employed.

It will be understood that certain features and subcombinations are of utility and may be employed without reference to other features and sub-combinations. This is contemplated by and is within the scope of the claims.

It is further obvious that various changes may be made in detail within the scope of the claims without departing from the spirit of the invention.

It is, therefore, to be understood that the invention is not to be limited to the specific details shown and described.

Having thus described my invention, what I claim is:

1. In apparatus for producing hydrocarbons, in combination, a vessel providing a reaction chamber, means for supplying a stream of heated reactant vapors commingled with contact mass to said chamber, a centrifugal separator for separating reaction product vapors from contaminated contact material, a line for conducting mixed reaction products and contact mass to said separator, regenerating means adapted to burn contaminating deposits from said mass, a line for conducting said contact material from said separator to said regenerating means, pneumatic conveying means arranged and adapted to conduct regenerated contact mass from said regenerating means toward said reaction vessel, and a conduit connection for conducting regeneration fumes from said regenerating means to said pneumatic conveying means to serve as conveying medium in the latter.

2. In effecting hydrocarbon reactions involving simultaneous flow of reactants and a solid contact mass through a reaction zone the process comprising flowing a continuous stream of commingled hydrocarbons and contact solid through the reaction zone, separating contaminated solid from the reaction product, feeding the separated solid to a regeneration zone, therein removing burnable deposits from said solid by combustion, discharging regenerated contact solid from said regeneration zone into an impelling zone, pneumatically conveying said regenerated solid toward said reaction zone while utilizing regeneration fumes issuing from said regeneration zone as pneumatic conveying medium, and separating regeneration fumes from said contact solid before admixing the latter with hydrocarbon reactants entering said reaction zone.

3. In apparatus for producing hydrocarbons, in combination, a vessel providing a reaction chamber, means for supplying a stream of heated reactant vapors commingled with heated contact mass to said chamber, a centrifugal separator for separating reaction product vapors from contaminated contact material, a line for conducting mixed reaction products and contact mass to said separator, regenerating means adapted to burn contaminating deposits from said mass, a line for conducting said contact material from said separator to said regenerating means, pneumatic conveying means arranged and adapted to conduct regenerated contact mass from said regenerating means toward said reaction vessel, and a conduit connection for conducting regeneration fumes from said regenerating means to said pneumatic conveying means to serve as conveying medium in the latter.

4. In apparatus for producing hydrocarbons, in combination, a vessel providing a reaction chamber, means for supplying a stream of heated reactant vapors commingled with heated contact mass to said chamber, a centrifugal separator for separating reaction product vapors from contaminated contact material, a line for conducting mixed reaction products and contact mass to said separator, regenerating means adapted to burn contaminating deposits from said mass, said means being provided with an inlet for oxygen bearing fluid and an outlet for products of combustion, means for pneumatically impelling solids arranged and adapted to receive contact mass issuing from said regenerating means, a conduit connection between said outlet for combustion products and said impelling means, and a conduit connection between the latter and said reaction vessel for pneumatically conveying contact mass toward said reaction chamber.

5. In apparatus for producing hydrocarbons, in combination, a vessel providing a reaction chamber, means for supplying a stream of heated reactant vapors commingled with heated contact mass to said chamber, a centrifugal separator for separating reaction product vapors from contaminated contact material, a line for conducting mixed reaction products and contact mass to said separator, regenerating means adapted to burn contaminating deposits from said mass, said means being provided with an inlet for oxygen bearing fluid and an outlet for products of combustion, means for pneumatically impelling solids arranged and adapted to receive contact mass issuing from said regenerating means, a conduit connection between said outlet for combustion products and said impelling means, a second separator adapted to separate solids from gases, a conduit for conducting contact mass and regeneration fumes from said impelling means to said second separator, and a duct for supplying contact solid issuing from said second separator to said first named means.

6. In effecting hydrocarbon reactions involving simultaneous flow of reactants and contact solids, the process comprising flowing commingled reactant vapors and solid contact material through a reaction zone, separating used contact material from reaction product vapors, subjecting contact material so separated to regeneration by controlled combustion to remove burnable deposit therefrom, continuously separating the regenerated catalyst from gaseous combustion products, returning thus separated regenerated contact material at controlled and approximately reaction temperature to said reaction zone, and utilizing flue gases resulting from said combustion to control the temperature of regeneration and to assist in presentation of said mass at said controlled temperature to the hydrocarbon reactants.

7. In a process of catalytically cracking high boiling hydrocarbons involving contacting vapors of the hydrocarbons at elevated temperatures with a pulverulent cracking catalyst, the improvement which comprises dispersing and suspending the cracking catalyst particles in a vapor stream of the hydrocarbons traveling at a relatively high velocity, injecting the dispersion into and passing it upwardly through a cracking zone of relatively large cross sectional area wherein the area of the path of said dispersion is greatly increased and the velocity of its vapor component correspondingly decreased, whereby only a portion of the injected catalyst particles are carried out overhead from the cracking zone in suspension in the vapor and a cloud-like accumulation of the catalyst particles is produced in said zone, withdrawing cracked vaporous reaction products from the upper part of the zone and recovering catalyst particles contained therein, and withdrawing that portion of the catalyst not carried off with the withdrawn cracked vaporous reaction products from the lower portion of said cracking zone.

8. In a process of catalytically cracking high boiling hydrocarbons involving contacting vapors of the hydrocarbons at elevated temperatures with a pulverulent cracking catalyst, the improvement which comprises dispersing the cracking catalyst particles in a vapor stream of the hydrocarbons, passing the dispersion upwardly through a cracking zone of relatively large cross sectional area in which the velocity of the vapor component is decreased, whereby only a portion of the injected catalyst particles are carried out overhead from the cracking zone in suspension in the vapor and a cloud-like accumulation of the catalyst particles is produced in said zone, withdrawing cracked vaporous reaction products from the upper part of the zone and recovering catalyst particles contained therein, and withdrawing that portion of the catalyst not carried off with the withdrawn cracked vaporous reaction products from the lower portion of said cracking zone.

9. In a process of catalytically cracking high boiling hydrocarbons involving contacting vapors of the hydrocarbons at elevated temperatures with a pulverulent cracking catalyst, the improvement which comprises suspending the cracking catalyst particles in a vapor stream of the hydrocarbons, passing the dispersion upwardly through a cracking zone of relatively large cross sectional area in which the velocity of its vapor component is decreased whereby to produce an accumulation of the catalyst particles to produce a cloud-like accumulation in said zone, withdrawing cracked vaporous reaction products from the upper part of the zone and recovering catalyst particles contained therein, and withdrawing that portion of the catalyst not carried off with the withdrawn cracked vaporous reaction products from the lower portion of said cracking zone.

10. In a process of catalytically cracking high boiling hydrocarbons involving contacting vapors of the hydrocarbons at elevated temperatures with a pulverulent cracking catalyst, the improvement which comprises dispersing the cracking catalyst particles in a vapor stream of the hydrocarbons, passing the dispersion upwardly through a cracking zone of relatively large cross sectional area in which the velocity of the vapor component is insufficient to carry all the injected catalyst particles out overhead from the cracking zone in suspension in the vapor and is sufficiently low to produce a cloud-like accumulation of the catalyst particles in said zone, withdrawing cracked vaporous reaction products from the upper part of the zone and recovering catalyst particles contained therein.

11. A continuous cyclic process of catalytically cracking high boiling hydrocarbons by an endothermic reaction involving contacting vapors of the hydrocarbons at elevated temperatures with a pulverulent cracking catalyst, which comprises dispersing heated particles of a solid cracking catalyst in a heated vapor stream of the hydrocarbons, passing the dispersion upwardly through a cracking zone of relatively large cross sectional area in which the velocity of the vapor component is sufficiently low to produce a cloud-like accumulation of the catalyst particles in said zone, said cracking zone being maintained at the desired cracking temperature by the sensible heat of the vapors and hot catalyst, withdrawing cracked vaporous reaction products from the upper part of the zone and recovering catalyst particles contaminated with carbonaceous material contained therein, continually passing used contaminated catalyst particles to a regeneration zone and removing the carbonaceous contaminant by combustion, and continually returning the hot regenerated catalyst to said first step to constitute said heated particles.

12. A process as defined in claim 11 wherein said stream of high boiling hydrocarbons consists of superheated vapors.

13. A continuous cyclic process of catalytically cracking high boiling hydrocarbons by an endothermic reaction involving contacting vapors of the hydrocarbons at elevated temperatures with a pulverulent cracking catalyst, which comprises dispersing heated particles of a solid cracking catalyst in a heated vapor stream of the hydrocarbons, passing the dispersion upwardly through a cracking zone of relatively large cross sectional area in which the velocity of the vapor component is sufficiently low to produce a cloud-like accumulation of the catalyst particles in said zone, said cracking zone being maintained at the desired cracking temperature by the sensible heat of the vapors and hot catalyst, withdrawing cracked vaporous reaction products from the upper part of the zone and recovering catalyst particles contaminated with carbonaceous material contained therein, continually passing used contaminated catalyst particles to a regeneration zone and dispersing them in an oxygen-containing gas, passing the last mentioned dispersion upwardly through a regeneration zone of relatively large cross sectional area in which the velocity of the gaseous component of the dispersion is sufficiently low to produce a cloud-like accumulation of the catalyst particles in the regeneration zone, removing the carbonaceous contaminant during the passage of the used catalyst through the regeneration zone by controlled oxidation thereof by the oxygen-containing gas, withdrawing gaseous regeneration products from the upper part of the regeneration zone and recovering hot regenerated catalyst particles contained therein, and continually returning hot regenerated catalyst particles to said first step to constitute said heated particles.

14. A continuous cyclic process of catalytically cracking high boiling hydrocarbons by an endothermic reaction involving contacting vapors of the hydrocarbons at elevated temperatures with a pulverulent cracking catalyst, which comprises dispersing heated particles of a solid cracking catalyst in a heated vapor stream of the hydrocarbons, flowing the dispersion upwardly through a cracking zone of relatively large cross sectional area in which the velocity of the vapor component is sufficiently low to carry in suspension only a portion of the catalyst particles commingled therewith and to produce a cloud-like accumulation of the catalyst particles in said zone, said cracking zone being maintained at the desired cracking temperature by the sensible heat of the vapors and hot catalyst, withdrawing cracked vaporous reaction products together with suspended used catalyst particles contaminated with carbonaceous material from an upper part of the zone and separating the suspended particles from the cracked vapors, withdrawing from a lower portion of the cracking zone used catalyst particles not withdrawn in suspension in the cracked vaporous reaction products, continually passing the withdrawn used contaminated catalyst particles to a regeneration zone and removing the carbonaceous contaminant by controlled combustion with an oxygen-containing gas, and continually returning the hot regenerated catalyst to said first step to constitute said heated particles.

15. A continuous cyclic process of catalytically cracking high boiling hydrocarbons by an endothermic reaction involving contacting vapors of the hydrocarbons at elevated temperatures with a pulverulent cracking catalyst, which comprises dispersing heated particles of a solid cracking catalyst in a heated vapor stream of the hydrocarbons flowing at a relatively high velocity sufficient to carry the dispersed particles in suspension therein, flowing the dispersion upwardly through a cracking zone of relatively large cross sectional area in which the velocity of the vapor component of the dispersion is decreased to an extent sufficient to carry in suspension only a portion of the catalyst particles commingled therewith and to produce a cloud-like accumulation of the catalyst particles in said zone, said cracking zone being maintained at the desired cracking temperature by the sensible heat of the vapors and hot catalyst, withdrawing cracked vaporous reaction products together with suspended used catalyst particles contaminated with carbonaceous material from an upper part of the zone and separating the suspended particles from the cracked vapors, withdrawing from a lower portion of the cracking zone used catalyst particles not withdrawn in suspension in the cracked vaporous reaction products, continually passing the withdrawn used contaminated catalyst particles to a regeneration zone and removing the carbonaceous contaminant by controlled combustion with an oxygen-containing gas and continually returning the hot regenerated catalyst to said first step to constitute said heated particles.

16. A continuous cyclic process of catalytically converting hydrocarbons by an endothermic reaction involving contacting vapors of the hydrocarbons at elevated temperatures with a suitable pulverulent solid catalyst, which comprises dispersing heated particles of the catalyst in a heated vapor stream of the hydrocarbons, flowing the dispersion upwardly through a conversion zone of relatively large cross sectional area in which the velocity of the vapor component is sufficiently low to carry in suspension only a portion of the catalyst particles commingled therewith and to produce a cloud-like accumulation of the catalyst particles in said zone, said conversion zone being maintained at the desired conversion temperature by supplying the endothermic heat of reaction as sensible heat from the hot vapors and hot catalyst, withdrawing cracked vaporous reaction products together with suspended used catalyst contaminated with carbonaceous material from an upper part of the zone and separating the suspended particles from the cracked vapors, continually passing the withdrawn used contaminated catalyst particles to a regeneration zone and removing the carbonaceous contaminant by controlled combustion with an oxygen-containing gas and continually returning the hot regenerated catalyst to said first step to constitute said heated particles.

WILLIAM J. DEGNEN.